United States Patent [19]

Harrington

[11] Patent Number: 5,183,298
[45] Date of Patent: Feb. 2, 1993

[54] PIPE FITTING REDUCERS

[76] Inventor: Michael B. Harrington, 112 Oakwood Pl., Lynchburg, Va. 24503

[21] Appl. No.: 690,268

[22] Filed: Apr. 24, 1991

[51] Int. Cl.⁵ .............................................. F16L 25/00
[52] U.S. Cl. ..................................... 285/12; 285/156; 285/177; 285/420; 285/422
[58] Field of Search ....................... 285/5, 6, 406, 364, 285/156, 420, 8, 12, 177, 230, 422

[56] References Cited

U.S. PATENT DOCUMENTS

| | | | |
|---|---|---|---|
| Re. 20,782 | 7/1938 | Hooper | 285/8 |
| D. 135,689 | 5/1943 | Rocic | 285/420 X |
| 774,633 | 11/1904 | Ackerman | 285/177 X |
| 1,128,080 | 2/1915 | Van Meter | 285/177 X |
| 1,801,171 | 4/1931 | Mueller et al. | 285/177 X |
| 2,857,576 | 10/1958 | Ueckert | 285/364 X |
| 3,272,538 | 9/1966 | Bergstrom | 285/231 |
| 4,289,169 | 9/1981 | Banholzer | 285/4 X |
| 4,648,631 | 3/1987 | Bryant | 285/177 |

FOREIGN PATENT DOCUMENTS 278190 6/1934 Italy ............................................ 285/5
734228 7/1955 United Kingdom .................... 285/5

Primary Examiner—Dave W. Arola
Attorney, Agent, or Firm—Nixon & Vanderhye

[57] ABSTRACT

Cast iron fittings are coupled with reducer fittings in a fluid handling network to reduce the flow diameter in various pipe sections of the network. Each main fitting and reducer fitting has two or more tabs about their mating open ends which are aligned and connected one to the other to maintain the fittings coupled together. Reducer fittings having standard size, large diameter ends, are provided with variously sized smaller diameter ends to selectively reduce the flow. The reducer fittings are straight-through sections useful with main fittings of various types, including Tees, elbows, right-angle bends and the like.

9 Claims, 2 Drawing Sheets

PIPE FITTING REDUCERS

BACKGROUND AND SUMMARY OF THE INVENTION

The present invention relates to cast iron pipe fittings and related methods for coupling, and particularly relates to fittings useful in fluid flow networks where reductions in flow through branch conduits are necessary and desirable.

Many and various types of fluid handling networks are known. For example, a fluid handling network may comprise a pipe system for irrigating a golf course. Depending upon the proximity to the source of fluid, the pipes forming the network branch from the fluid source into various pipe sections, typically of decreasing diameter. Those pipe sections extend in a plurality of different directions and likewise branch into additional pipe sections of decreasing diameter. Fittings are employed to (i) connect the pipe sections one to the other, (ii) reduce the diameter of the pipe sections and (iii) enable the pipe sections to extend in different directions. Fittings for this purpose are typically supplied in various configurations, such as Tees, elbows, right-angle bends, bends at acute angles, etc., with one or more of the openings of the fittings having a diameter the same as or different than the diameters of other of the openings.

A manufacturer or supplier of fittings may stock a very substantial number of sizes of the various fittings or have sufficient patterns available to manufacture on demand the various sizes of fittings required to accommodate most but not all of the requirements for fittings for various fluid handling networks. For example, in the representative example of the irrigation system for a golf course, dozens of standard fittings are required, along with a substantial number of specialty or customized fittings to meet the requirements of the particular fluid handling network. Thus, a manufacturer or supplier of pipe fittings may have in inventory the standard fittings needed for the construction of a particular irrigation project, but the cost of such inventory would be quite substantial, if not prohibitive. Even if an inventory of standard fittings is not maintained, the cost of obtaining various patterns from which those standard fittings can be manufactured on demand is substantial.

Aside from the substantial expense of maintaining an inventory of fittings or bearing the cost of a substantial number of patterns, the number of non-standard or custom fittings required for each different project poses a particular problem for the supplier of the fittings. While the supplier may justify purchasing patterns for relatively standard fittings, it is burdensome to obtain a pattern for a special or custom fitting when only a couple of fittings will be sold for a particular system. The investment costs are simply too substantial.

In an effort to solve this and other problems, plastic fittings, for example, PVC, have been used. This has resulted in decreased production and tooling costs as plastic tends to be more readily amenable to producing standard, as well as specialty, fittings. However, plastic fittings have been shown to be disadvantageous in certain aspects and the industry still prefers the cast iron fitting.

The present invention therefore provides cast iron fittings and a related method of coupling the fittings into a fluid supply network which minimizes or eliminates the foregoing and other problems and disadvantages associated with prior art fittings and provides novel and improved fittings for facilitating the design and construction of fluid supply networks as well as to reduce the cost associated with its construction. According to the present invention, there is provided a pipe coupling system using cast iron standard main fittings in combination with cast iron reducer fittings. It will be appreciated that the standard main fittings, whether they be Tees, bends, elbows, etc., comprise fittings with two or more ends which may have the same or different diameters relative to one another. Thus, a main fitting can be employed for reducing the flow diameter, for example, from a 12-inch flow to an 8-inch flow. A reducer fitting, according to the present invention, is a straight pipe section having opposite ends of different diameters. Instead of manufacturing and supplying a large number of expensive standard main fittings with various diameter openings at the ends thereof (the number of combinations and permutations of which is very substantial), the present invention employs reducer fittings which can be manufactured simply, inexpensively and in discrete sizes to reduce the flow diameters flowing through the outlet openings of the main fittings. For example, reducer fittings having a predetermined diameter opening at one end may be provided with different-sized openings at its opposite end. Consequently, a selected reducer fitting may be used in conjunction with a standard main fitting for reducing the flow to the desired flow diameter, depending upon the selection of the reducer fitting.

Thus, by providing a number of basic patterns of main fittings and combining them with one or more of the variously sized reducer fittings, it is possible to create a large number of diameter combinations. Moreover, all configurations can be factory or field-assembled and jobs need not be delayed pending fabrication of specialized fittings. Additionally, if a combined fitting is not used on the job, it can be broken down into the standard main-fitting and reducer fitting for subsequent use. This flexibility benefits designer, contractors and suppliers because it allows changes to be made in the field, reduces the amount of inventory and minimization or diminution of special or custom fittings.

More specifically, where a main Tee-fitting is used, the large-diameter end of a reducer fitting may be secured into an end of the Tee-fitting. The opposite end of the reducer fitting with its reduced diameter opening is then connected to a pipe section downstream of the main fitting. For example, a standard main fitting may have a twelve-inch inlet and an eight-inch outlet opening. To reduce the flow even further, a reducer fitting may be selected from a set of reducer fittings or patterns having an eight-inch inlet opening for coupling with the eight-inch outlet opening of the Tee and any lesser size outlet opening, e.g., six, four or two-inch diameter openings. A particular advantage of this system resides in the capability of the manufacturer and supplier of fittings to have an inventory of reducer fittings or patterns therefor of various sizes at a substantially decreased cost in comparison with providing costly main fittings in the various size combinations necessary to provide not only the standard fittings but also the customized and specialized fittings necessary for fluid handling networks. It also reduces the number of different sizes of main fittings necessary to accommodate a particular job.

Moreover, the present invention affords a simplicity of assemblage of the various pipe fittings. For example, at the end of each main fitting, there is provided two or more radially outwardly projecting, circumferentially-spaced lugs. The reducer fitting has a similar number of radially outwardly projecting, circumferentially-spaced lugs at a location spaced back from the cylindrical end of the reducer fitting. The cylindrical end is sized for reception in the bell of the main fitting. Consequently, when the reducer fitting is connected to the main fitting, the cylindrical end is inserted into the bell, and the lugs are aligned one with the other. A metal wrapping or strap is applied to the registering lugs to secure the reducer fitting and main fitting one to the other. Similar reducer fittings may be applied to other openings of each main fitting, it being appreciated that it is essential to secure each reducer fitting to its adjoining main fitting to prevent the flow pressure from axially displacing the reducer fitting downstream from the main fitting.

In a preferred embodiment according to the present invention, there is provided a pipe coupling system for use in a fluid handling network, a cast pipe fitting having a central body with first and second ends having openings therein, the fitting having radially outwardly projecting, circumferentially-spaced, tabs about at least one of the open ends, the tabs defining restraint lugs and being cast integrally with the fitting and means carried by the tabs for joining the fitting to an adjacent fitting, including recessed portions formed on the tabs on the side thereof opposite the associated open end.

In a further preferred embodiment according to the present invention, there is provided a pipe coupling system for use in a fluid handling network, a cast pipe reducer fitting having a central body with first and second ends having openings therein, the first end of the fitting having a diameter larger than the second end thereof whereby the second end defines a reducer flow diameter, the body having a central tapered section between the first and second ends and a cylindrical section extending from the tapered section to the first end thereof, the fitting having radially outwardly projecting, circumferentially-spaced, tabs thereabout and located adjacent the juncture of the tapered and cylindrical sections and the tabs defining restraint lugs and being cast integrally with the fitting.

In a further preferred embodiment according to the present invention, there is provided a pipe coupling system for a fluid handling network comprising a cast pipe fitting having a central body with first and second ends having openings therein, the fitting having radially outwardly projecting, circumferentially-spaced, tabs about each of the open ends, the tabs defining restraint lugs and being cast integrally with the fitting, a reducer fitting having a central body with first and second ends having openings therein with the first end being larger in diameter than the second end, the body having a central tapered section between the first and second ends and a cylindrical section extending from the tapered section to the first end thereof, the reducer fitting having radially outwardly projecting, circumferentially-spaced, tabs thereabout and located adjacent the juncture of the tapered and cylindrical sections, the tabs on the reducer fitting defining restraint lugs cast integrally therewith, the cylindrical section of the reducer fitting being inserted into one of the open ends of the cast pipe fitting, the one end of the cast pipe fitting having a seal for sealing the cylindrical section of the reducer fitting thereto and means for securing the lugs of the cast pipe and reducer fittings one to the other to secure the fittings to one another.

In a further preferred embodiment according to the present invention, there is provided a method of coupling pipes forming a fluid handling network comprising the steps of providing a cast pipe fitting having a central body with first and second ends having openings therein, the fitting having radially outwardly projecting, circumferentially-spaced, tabs about the openings defining restraint lugs, providing a reducer fitting having a central body with first and second open ends, the first end having a diameter larger than the second end, the reducer fitting having radially outwardly projecting, circumferentially-spaced, tabs thereon defining restraint lugs located intermediate the ends and which lugs have recessed portions formed on sides thereof opposite adjacent open ends, inserting the first end of the reducer fitting into the first end of the cast pipe fitting, aligning the tabs of the cast pipe fitting about the first end thereof and the tabs about the reducer fitting one with the other and securing the aligned tabs one to the other by wrapping flexible elements about the aligned tabs.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to a present preferred embodiment of the invention, an example of which is illustrated in the accompanying drawings.

Figure 1:
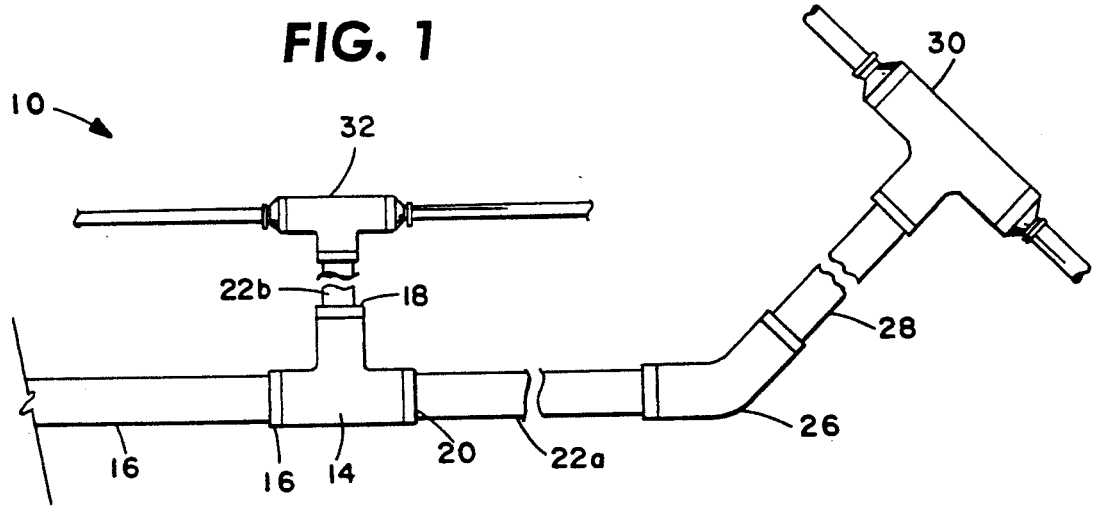
FIG. 1 is a fragmentary perspective view of a portion of a fluid network constructed in accordance with the present invention.

In FIG. 1, there is illustrated a fluid handling network, generally designated 10, employing a combination of main and reducer fittings according to the present invention. Fluid network 10 may comprise, for example, an irrigation system for a golf course having a main supply pipe 12 supplying water to a main first Tee-fitting 14 wherein the inlet opening 16 of Tee-fitting 14, in this exemplary embodiment, is larger in diameter than the two outlet openings 18 and 20, respectively. Pipe sections 22 are connected to the main Tee-fitting 14, which ultimately branch into a multiplicity of pipe sections downstream. For example, the pipe section 22a may be disposed into the open end of a main bend fitting 26 which, in turn, is connected through a pipe branch 28 with a further Tee-fitting 30. The other pipe branch 22b similarly extends into the side opening of a main Tee-fitting 32, with reduced diameter openings 34 and 36 at its opposite ends in communication with reducer fittings 38 constructed in accordance with the present invention. The main Tee-fitting 30 likewise may be connected to a plurality of branch conduits through the use of reducer fittings, as explained herein. Consequently, the large-diameter pipe section 12 from the main supply of fluid is reduced in diameter to a multiplicity of smaller pipe sections by the use of combinations of main fittings and reducer fittings, the main fittings comprising Tees, elbows, bends or the like, each with two or more identically or differently sized inlet and outlet openings.

Figure 2:
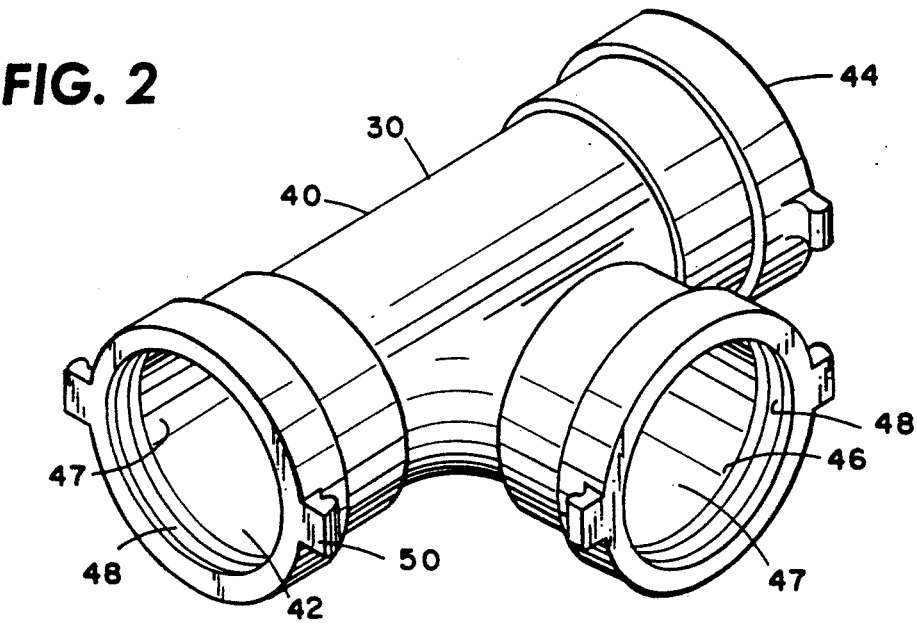
FIG. 2 is a perspective view of a main Tee-fitting according to the present invention.

Referring now to FIG. 2, there is illustrated a Tee-fitting according to the present invention. The Tee-fitting, preferably comprises a cast pipe fitting formed of cast ductile iron and may be any one or more of the fittings illustrated in FIG. 1. Fitting 30 includes a central straight-through pipe body or section 40 having opposite first and second ends 42 and 44 and an intermediate opening 46 communicating with the central pipe section 40. It will be appreciated that the intermediate opening 46, in the illustrated fitting, has a larger diameter than either of the first and second ends 42 and 44, and that the first and second ends 42 and 44 may have the same or different diameters smaller than the diameter of opening 46. Alternatively, one of ends 42 and 44 may have the same diameter as inlet 46. Each of the open ends 42, 44, 46 of the main Tee-fitting 40 has an interior bell section 47 for receiving a cylindrical section of the reducer fitting, to be described, and includes an annular groove, for example, a groove 48 shown at end openings 42 and 46 for receiving a seal.

According to the present invention, two or more tabs 50 project radially from the ends of the main Tee-fitting at spaced circumferential positions thereabout. In the preferred form, fittings 50 are diametrically opposed one to the other and are cast integrally with the fitting. With specific reference to FIG. 5, the sides of tabs 50 remote from the corresponding end of the fitting are recessed at 52, for purposes which will become clear from the ensuing description.

Figure 3:
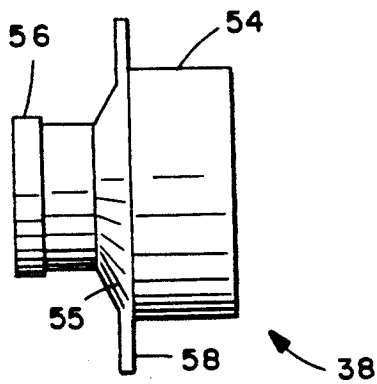
FIG. 3 is a plan view of a reducer fitting according to the present invention.
Figure 4:
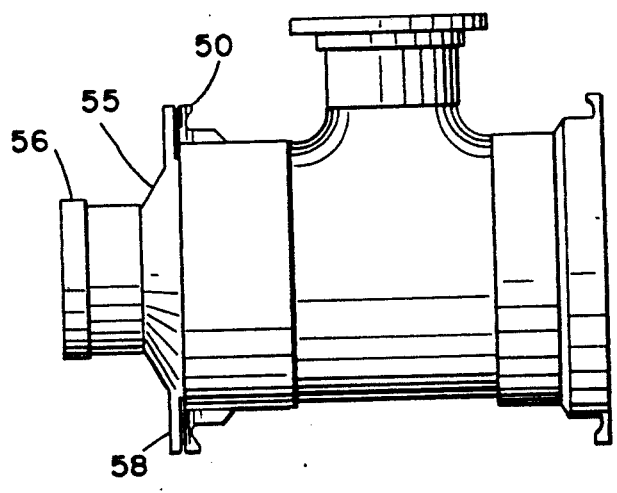
FIG. 4 is a plan view of the reducer fitting of FIG. 3 inserted into the open end of a main Tee-fitting.

Referring now to FIG. 3, there is illustrated a reducer fitting, generally designated 38. Reducer fitting 38 comprises a straight-through pipe section having a generally large diameter cylindrical extension 54 at one end for reception in the bell-shaped section 47 of a main fitting. Fitting 38 also has a reduced diameter end 56 opposite the cylindrical section 54 with a tapered section 55 intermediate the opposite ends. Thus, when reducer fitting 38 is applied to the correspondingly sized end of a main fitting, the flow through the cylindrical section 54 is reduced by the tapered section 55 for flow through the distal end opening 56.

To secure a reducer fitting to a main fitting, two or more tabs 58 project radially at circumferentially-spaced positions at a location substantially intermediate the ends of reducer fitting 38 and between the cylindrical and tapered sections 54 and 55, respectively. These tabs 58 are preferably provided at like circumferential positions thereabout as tabs 50 are provided on the ends of the main fittings. Consequently, when the reducer fitting is connected to the main fitting by inserting cylindrical section 54 in the bell-shaped section of the main fitting, the tabs 58 and 50 are aligned to register one with the other.

Figure 5:
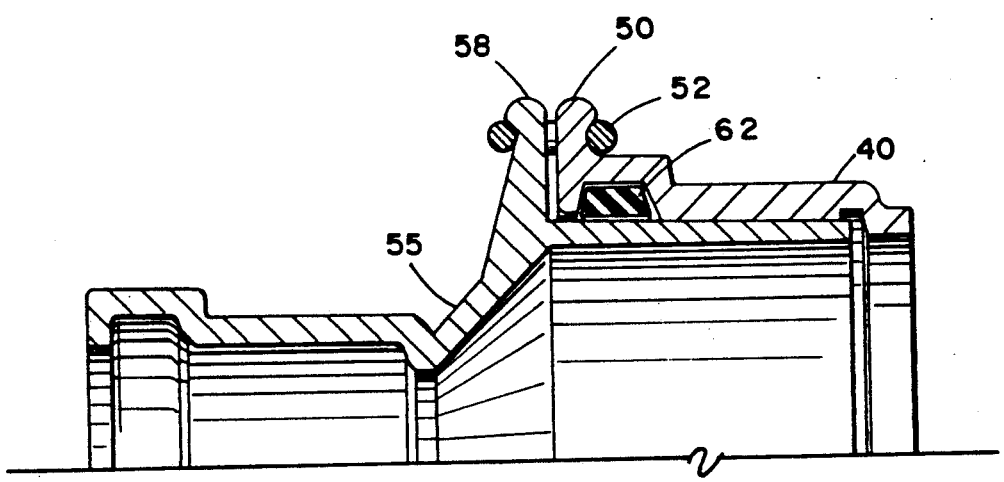
FIG. 5 is an enlarged fragmentary cross-sectional view of the connection of the reducer fitting of FIG. 3 and the main Tee-fitting of FIG. 4.

With reference to FIG. 5, the registering tabs may be secured one to the other by a wrapping or a wire clip 60 about the tabs 50 and 58. Preferably, the wire clip 60 is received in the recess 52 of tab 50 and a corresponding recess on the backside of the tab 58. As illustrated, the cylindrical section 47 bears against a seal 62 provided in annular recess 48.

It will be appreciated therefore that the objects of the present invention are fully accomplished in that the reducer fitting 38 may be formed having its inlet end of a standard size and its outlet end of various sizes such that its cylindrical section 54 may be received in the correspondingly shaped bell openings of the standard main fittings. For example, a main Tee may have 12-inch openings at both its inlet and outlet ends. Reducer fittings may be provided in various sizes, with each cylindrical section 54 sized to be received in the 12-inch opening of the main Tee and the opposite ends sized to different diameters, i.e., 10-inch, 8-inch, 6-inch, 4-inch or 2-inch. Thus, a number of combinations of reductions in flow diameter may be provided for that particular Tee-fitting, depending upon the selection of the reducer fitting. If the main Tee-fitting has 10-inch openings, by proper selection of the reducer fitting, the flow diameter may be reduced to the selected size. Of course, the other main fittings may be likewise dimensioned, for example, the bends, elbows and the like. Thus, it will be seen that a combination of a number of main fittings, with various reducer fittings, provides for a very substantial number of differently sized combinations substantially minimizing or eliminating the need for specialty or customized fittings and reducing the required number of main fittings.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pipe coupling system for a fluid handling network comprising:
   a cast iron pipe fitting having a central body with first and second ends having openings therein:
   said fitting having radially outwardly projecting, circumferentially-space, tabs about each of said open ends;
   said tabs defining restraint lugs and being cast integrally with said fitting;
   a cast iron reducer fitting having a central body with first and second ends having openings therein with said first end being larger in diameter than said second end, said body having a central tapered section between said first and second ends and a cylindrical section extending from said tapered section to said first end thereof;
   said reducer fitting having radially outwardly projecting circumferentially-spaced, tabs thereabout and located adjacent the juncture of said tapered and cylindrical sections;
   the tabs on said reducer fitting defining restraint lugs cast integrally therewith;
   said cylindrical section of said reducer fitting being inserted into one of said open ends of said cast pipe fitting with the tabs on said cast pipe fitting and said reducer fitting being axially aligned with one another, said one end of said cast pipe fitting having a seal for sealing said cylindrical section of said reducer fitting thereto; and means for securing the aligned lugs of said cast pipe and reducer fittings one to the other to secure said fittings to one another.

2. A pipe coupling system according to claim 1 wherein said securing means includes a wire wrapped about each of the aligned lugs.

3. A pipe coupling system for a fluid handling network, comprising:
a cast iron pipe fitting having a central body with first and second ends having openings therein, said fitting having radially outwardly projecting, circumferentially-spaced, tabs about one of said open ends, said tabs defining restraint lugs and being cast integrally with said fitting;
a plurality of reducer fittings each having a central body with first and second ends having openings therein, with said first end being larger in diameter than said second end, said body having a central tapered section between said first and second ends thereof, a cylindrical section extending from said tapered section to said first end thereof and radially outwardly projecting circumferentially spaced tabs thereabout and located adjacent the juncture of said tapered section and said cylindrical section, the tabs defining restraint lugs cast integrally therewith, the second ends of said plurality of reducer fittings having different diameters from one another whereby a predetermined reduction of fluid flow from said cast pipe fitting through the second end of a reducer fitting may be accomplished in accordance with the selection of one of said plurality of reducer fittings and its application to said cast pipe fitting, said cylindrical section of each said reducer fitting being receivable in said one open end of said cast pipe fitting when applied thereto, the tabs on said cast pipe fitting and the tabs of the selected one reducer fitting being axially aligned with one another, means for securing the aligned lugs of said cast pipe and the selected one reducer fitting one to the other to secure said cast pipe fitting and said selected one reducer fitting to one another, and means forming a seal for sealing the cylindrical section of the selected one reducer fitting to said cast pipe fitting.

4. A pipe coupling system according to claim 3 wherein said securing means includes a wire wrapped about each of the aligned lugs.

5. A pipe coupling system according to claim 3 wherein said cast pipe fitting is in the form of a T, having a third end with an opening therein, radially outwardly projecting, circumferentially-spaced tabs about said third open end and defining restraint lugs cast integrally with said cast pipe fitting, the cylindrical section of each said reducer fitting being receivable in the third opening of said cast pipe fitting when applied thereto, the tabs on said cast pipe fitting about said third open end and the tabs of a second selected reducer fitting applied tot he third open end being axially aligned with one another, means for securing the aligned lugs of said cast pipe about said third open end and the second selected reducer fitting receivable in the third opening one to the other to secure said cast pipe fitting and the second selected reducer fitting to one another, and means forming a seal for sealing the cylindrical section of the selected second reducer fitting to said cast pipe fitting about said third opening.

6. A pipe coupling system according to claim 5 wherein said securing means includes a wire wrapped about each of the aligned lugs.

7. A pipe coupling system for a fluid handling network, comprising:
a cast iron pipe fitting in the form of a T having a central body with first, second and third ends having openings therein, said fitting having radially outwardly projecting, circumferentially-spaced, tabs about said first and third open ends, said tabs defining restraint lugs and being cast integrally with said fitting;
first and second groups of a plurality of reducer fittings, each reducer fitting in each group having a central body with first and second ends having openings therein, with said first end being larger in diameter than said second end, said body having a central tapered section between said first and second ends thereof, a cylindrical section extending from said tapered section to said first end thereof and radially outwardly projecting circumferentially spaced tabs thereabout and located adjacent the juncture of said tapered section and said cylindrical section, the tabs defining restraint lugs cast integrally therewith, the second ends of said plurality of reducer fittings of each group having different diameters from one another whereby a predetermined reduction of fluid flow from said cast pipe fitting through the second end of a reducer fitting may be accomplished in accordance with the selection of a reducer fitting from said plurality of reducer fittings and its application to said cast pipe fitting;
said cylindrical section of each said reducer fitting of said first group thereof being receivable in said first open end of said cast pipe fitting when applied thereto, the tabs on said cast pipe fitting about said first end thereof and the tabs of a reducer fitting selected from said first group thereof, and applied to the first end of said cast pipe fitting, being axially aligned with one another;
said cylindrical section of each said reducer fitting of said second group thereof being receivable in said third open end of said cast pipe fitting when applied thereto, the tabs on said cast pipe fitting about said third end thereof and the tabs of a reducer fitting selected from said second group thereof, and applied tot he third end of said cast pipe fitting, being axially aligned with one another;
means for securing the aligned lugs of said first and third ends of said cast pipe and the selected reducer fittings, respectively, one to the other to secure said selected reducer fittings to said cast pipe fitting; and
means forming a seal for sealing the cylindrical section of each selected reducer fitting to said cast pipe fitting.

8. A pipe coupling system according to claim 7 wherein said securing means includes a wire wrapped about each of the aligned lugs.

9. A pipe coupling system according to claim 7 wherein the second ends of said selected reducer fittings have diameters different from one another.

* * * * *